United States Patent [19]

Lewis

[11] 4,352,151

[45] Sep. 28, 1982

[54] LIGHTING APPARATUS

[76] Inventor: Andrew G. Lewis, 1090 Webster La., Des Plaines, Ill. 60016

[21] Appl. No.: 169,668

[22] Filed: Jul. 17, 1980

Related U.S. Application Data

[63] Continuation of Ser. No. 900,823, Apr. 28, 1978, abandoned.

[51] Int. Cl.[3] .............................................. B60Q 1/00

[52] U.S. Cl. .................................... 362/368; 362/147; 362/367; 362/372; 362/375

[58] Field of Search ............... 362/135, 225, 367, 147, 362/368, 372, 375

[56] References Cited

U.S. PATENT DOCUMENTS

| | | | |
|---|---|---|---|
| 3,292,287 | 12/1966 | Marn | 362/135 X |
| 4,233,656 | 11/1980 | Shemitz | 362/367 X |
| 4,246,629 | 1/1981 | Marrero | 362/225 X |

*Primary Examiner*—Stephen J. Lechert, Jr.
*Attorney, Agent, or Firm*—Bernard L. Kleinke

[57] ABSTRACT

A lighting apparatus adapted to be mounted in a corner space includes a light emitting device mounted on a frame which is adapted to be mounted in the corner space. The frame includes a substantially triangularly shaped front panel disposed in front of the light emitting device and at least partially composed of translucent material to permit light to pass therethrough. At least one mounting member is connected fixedly along one of its edges to an adjoining edge of the front panel with the planes of the panel and the member being disposed at an acute angle. The mounting device includes at least one fastening member receiving opening therein to facilitate the mounting of the apparatus to at least one of the surfaces. The light emitting device may include a light directing device adjustably mounted on the frame.

5 Claims, 8 Drawing Figures

FIG. 1
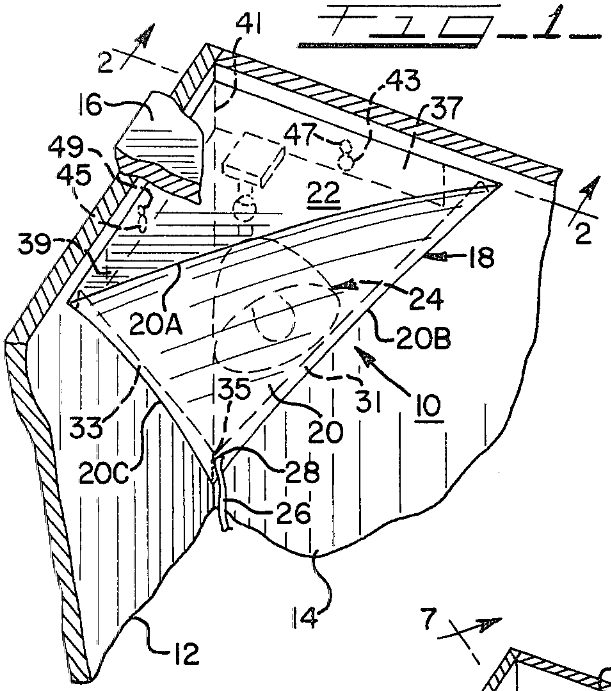
FIG. 2
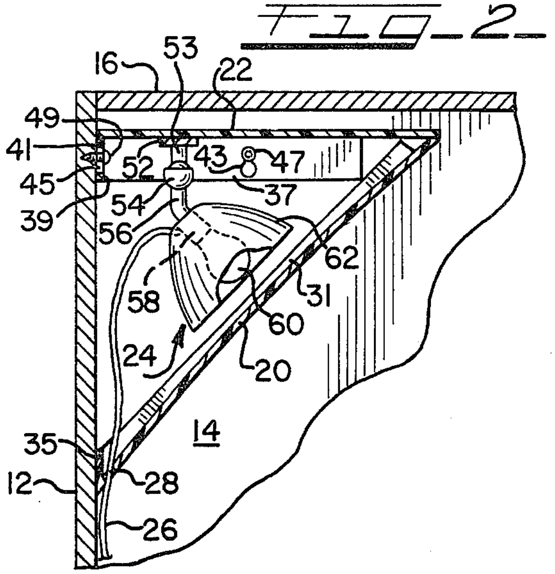
FIG. 6
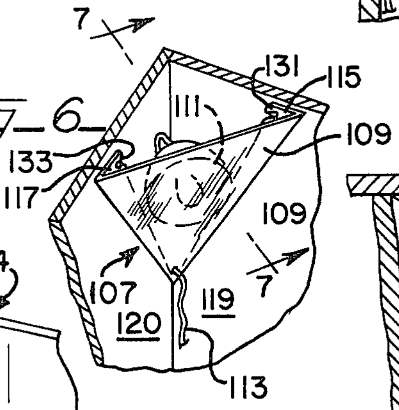
FIG. 4
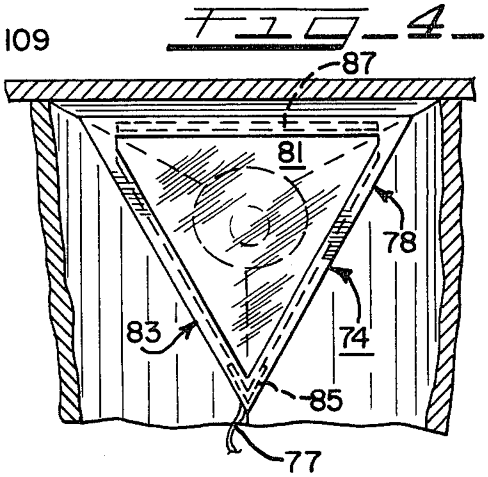
FIG. 3
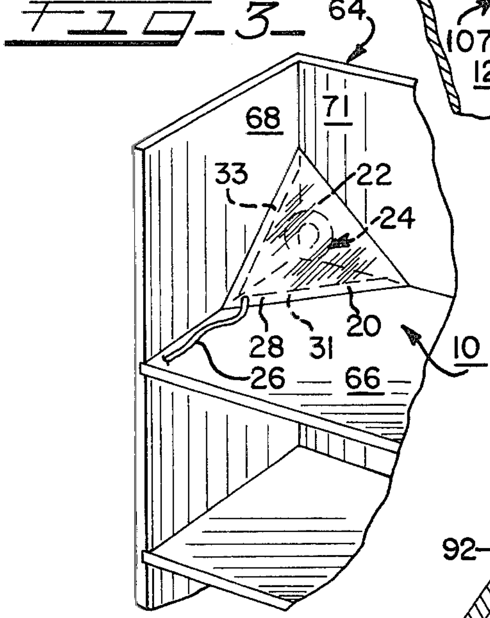
FIG. 8
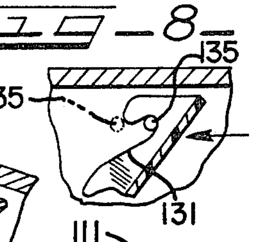
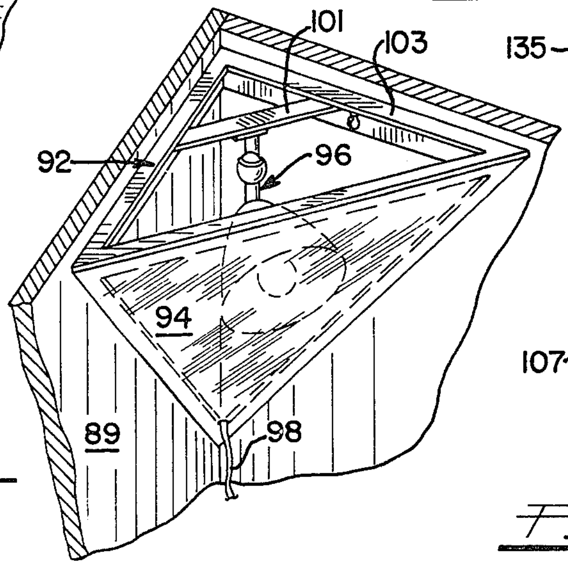
FIG. 5
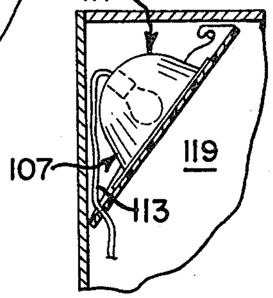
FIG. 7

LIGHTING APPARATUS

This is a Continuation of application Ser. No. 900,823, filed Apr. 28, 1978 now abandoned.

The present invention relates to a lighting apparatus, and more particularly relates to a lighting apparatus adapted to be mounted in a corner space.

Many different types and kinds of lighting fixtures and the like lighting apparatus have been employed. For example, well known ceiling lighting fixtures have been mounted on and depend from the ceiling of a room. With such an installation, it is the usual practice to have the electrical wiring installed in the ceiling and in the walls. Such an installation should necessarily be made by qualified electricians. Another type of overhead lighting is provided by the installation of so-called swag lamps which are typically suspended from the ceiling by means of a chain which has the electrical cord attached thereto. While such swag lamps have been entirely satisfactory for some applications, it would be highly desirable to have a lighting apparatus which does not require special wiring installations and which is less conspicuous than conventional swag lamps. Moreover, such a lighting apparatus should be aesthetically pleasing and relatively inexpensive to manufacture. Additionally, such lighting apparatus should be relatively flexible in its use so that it can be used for both indoors and out of doors as well as for special installations such as on bookcases, shelving, or the like.

Therefore, the principal object of the present invention is to provide a new and improved lighting apparatus, which does not require special electrical wiring installations, and which may be mounted as an overhead light in an inconspicuous manner.

Another object of the present invention is to provide a new and improved lighting apparatus, which is aesthetically pleasing in appearance, and which is relatively inexpensive to manufacture, while being flexible in its use.

Briefly, the above and further objects of the present invention are realized by providing a lighting apparatus which includes a generally triangularly-shaped inclined front face panel which is at least partially composed of translucent material through which light is directed from an electrically energizable light emitting device mounted behind the front panel.

Other objects and advantages of the present invention will become apparent to those skilled in the art by a review of the accompanying specification and drawings, wherein:

FIG. 1 is a fragmentary cross-sectional pictorial view of a lighting apparatus, which is constructed in accordance with the present invention;

FIG. 2 is a cross-sectional view of the lighting apparatus of FIG. 1 taken substantially along the line 2—2 thereof;

FIG. 3 is a fragmentary reduced-scale pictorial view of the apparatus of FIG. 1 illustrating the lighting apparatus being used in a different environment;

FIG. 4 is a cross-sectional fragmentary pictorial view of still another lighting apparatus, which is constructed in accordance with the present invention;

FIG. 5 is a cross-sectional fragmentary view of yet another lighting apparatus, which is constructed in accordance with the present invention;

FIG. 6 is a cross-sectional fragmentary view of a further lighting apparatus which is constructed in accordance with the present invention;

FIG. 7 is a cross-sectional view of the apparatus of FIG. 6 taken substantially along the line 7—7 thereof; and FIG. 8 is an enlarged detail view of a portion of the apparatus of FIG. 7.

Referring now to the drawings, and more particularly to FIGS. 1 and 2 thereof, there is shown a lighting apparatus 10, which is constructed in accordance with the present invention, and which is mounted in a corner space defined by a pair of intersecting vertical walls 12 and 14 near the ceiling 16 of a room of a building (not shown). The apparatus 10 generally comprises a frame 18 which includes a translucent triangularly-shaped front panel 20 fixedly connected to a triangularly-shaped base panel 22, which is disposed in a horizontal disposition spaced slightly from the ceiling 16 in the position as illustrated in FIG. 1 of the drawings. A light emitting device 24 is mounted on the underside of the base panel 22 and directs light forwardly through the front panel 20 for illumination purposes. An electrical power cord 26 is adapted to be connected to a source of electrical power (not shown) for energizing electrically the light emitting device 24, the cord 26 extending downwardly from the front face panel 20 along the walls 12 and 14 at the intersection thereof. As a result, the cord 26 is relatively inconspicuous, since it is disposed in the corner portion of the room.

As shown in FIGS. 1 and 2 of the drawings, the apparatus 10 is installed near the ceiling 16 and directs a beam of light at an inclined angle therefrom in a direction transverse to the face of the front panel 20. As hereinafter described in greater detail, the apparatus 10 is fixed to the walls 12 and 14, and therefore the apparatus 10, if desired, may be mounted at a greater distance from the ceiling. In this regard, the apparatus 10 may, for example, be mounted midway between the floor and ceiling of a room so that it can be used to illuminate a chair, sofa or other seating area so that a person can use the apparatus 10 as a reading lamp. In such a position, the upper surface of the base panel 22 serves as a shelf, and thus it may be used to support a decorative item, such as a planter. The apparatus 10 may also be used in other areas of the room. For example, the apparatus 10 can be inverted and placed on the floor (not shown) of the room in the corner space where the floor adjoins the intersecting walls 12 and 14. In this manner, the light beam is directed at an inclined angle upwardly to serve as a flood light. Additionally, the apparatus 10 may be used both indoors and out of doors. When used out of doors, the apparatus 10 may be used to illuminate a doorway, and thus the lighting apparatus 10 serves as a coach light. An additional use of the apparatus 10 is illustrated in FIG. 3 of the drawings as hereinafter described in greater detail.

Considering now the front panel 20 in greater detail, a hole 28 is disposed in the lower portion of the front panel 20 for receiving the power cord 26. A pair of flanges 31 and 33 extend rearwardly from the side edges of the front panel 20 for engaging the respective walls 14 and 12 to help support the apparatus 10 in place. The flanges 31 and 33 extend almost the entire length of the side edges of the front panel 20 and terminate at their lower ends at a mitred corner 35 which fits into and engages the intersecting line of engagement between the walls 12 and 14 to help support the apparatus 10 in position.

Considering now the top panel 22 in greater detail with reference to the drawings, a pair of flanges 37 and 39 depend from the top panel 22 and extend almost entirely along the outer side edges thereof to engage the respective walls 14 and 12. The flanges 37 and 39 terminate at their rearwardmost edges in a mitred corner 41 which fits into the line of engagement between the walls 14 and 12. A pair of keyhole slots 43 and 45 are disposed in the respective flanges 37 and 39 to receive a pair of fastening devices, such as the screws 47 and 49, respectively, to support the apparatus 10 from the walls 12 and 14. The larger portion of the keyhole slots 43 and 45 are disposed near the lowermost edges of the flanges 37 and 39 so that the apparatus 10 can be readily mounted on the walls. In this regard, in order to mount the apparatus 10 in place, the screws 47 and 49 are driven into the walls 14 and 12, respectively, until the heads of the screws are spaced only a slight distance from the walls. The apparatus 10 is then placed near to and almost engaging the ceiling 16, and then the apparatus 10 is slid back into the corner space until the keyhole slots receive the screw heads in the larger portions of the keyhole slots. In this regard, the flanges 37 and 39 flex inwardly by a slight amount to snap the screw heads into engagement with the keyhole slots in the flanges. Thereafter, the apparatus 10 is released to permit it to fall under the force of gravity to the position as illustrated in FIGS. 1 and 2 of the drawings with the screws disposed in the upper smaller portions of the keyhole slots.

Considering now the light emitting device 24 in greater detail with reference to the drawings, a mounting plate 52 is fixed by any convenient means (not shown) to the underside of the base panel 22, and a stem 53 fixed at one of its ends to the plate 52 has a ball swivel joint 54 secured at its lower end for the purpose of connecting to a forwardly bent stem 56. The forward distal end of the stem 56 has mounted thereon a light bulb socket 58 into which is electrically engaged a light bulb 60 for directing light through the translucent front panel 20. A light directing shade or light guide 62 is mounted on the light bulb socket 58 surrounding the light bulb 60 for guiding the light to a desired area to be illuminated. In this regard, the user can adjust to the beam of light traversing the front panel 20 so as to guide the light to the desired area to be illuminated. In this regard, in the position as illustrated in FIGS. 1 and 2 of the drawings, the apparatus 10 can serve the same purpose as track lighting.

Referring now to FIG. 3 of the drawings, the apparatus 10 can be used on a bookcase shelf of a bookcase 64. In this regard, the lighting apparatus 10 may be placed in a corner space at a side wall 68 which adjoins a back or rear wall 71 of the bookcase 64.

As shown in FIG. 3 of the drawings, the apparatus 10 rests on the shelf 66 with the flange 31 engaging the shelf 66 and the base panel 22 engages the rear wall 71. The flange 33 engages the side wall 68, and the power cord 26 extends from the front face panel 20 to be connected to a source of electrical power.

For an aesthetically pleasing appearance, the front panel 20 is dish shaped and is concave inwardly. The upper edge 20A and the two side edges 20B and 20C of the panel 20 is curved as shown in FIG. 1 of the drawings. The panel 20 is inclined downwardly and rearwardly from its upper edge 20A, and the side edges 20B and 20C extend downwardly and rearwardly from the upper edge 20A, the edges 20B and 20C terminating and intersecting at their lower ends in a point at the bottom end of the mitred corner 35.

Referring now to FIG. 4 of the drawings, there is shown a lighting apparatus 74, which is similar to the lighting apparatus 10 and which is also constructed according to the present invention. The apparatus 74 is mounted in a similar manner as the apparatus 10 and includes a similar light emitting device 76 having a power cord 77 and disposed behind a triangularly shaped front panel 78, the device 66 being mounted on the base panel (not shown). The panel 78 is similar to the front panel 20, except that the panel 78 includes a removable triangular panel or plate 81 held in place within an open triangular frame 83. A V-shaped bracket 85 on the rear side of the frame 83 supports from below the lower portion of the plate 81, which may be composed of transparent or translucent plastic or glass material or the like. An upper bracket 87 fixed at the back side of the frame 83 at the upper portion thereof receives removably the upper edge of the plate 81.

Thus, the plate 81 may be removed conveniently to change light bulbs without the necessity of removing the entire apparatus 74.

Referring now to FIG. 5 of the drawings, there is shown a lighting apparatus 89, which is constructed in accordance with the present invention and which is similar to the apparatus 74. The apparatus 74 includes an open frame 92 having a front translucent panel 94 fixed thereto. A light emitting device 96 having a power cord 98 is supported from a cross member or bar 101 forming a portion of a horizontal base portion 103 of the frame 92.

Referring now to FIGS. 6, 7 and 8 of the drawings, there is shown a lighting apparatus 107 which is constructed according to the invention and which is similar to the apparatus 10 except that the apparatus 107 does not have a base panel. The apparatus 107 includes a triangular front panel 109 having fixed to the rear side thereof a light emitting device 111 having an electrical power cord 113. A pair of side flanges 115 and 117 are similar to the flanges 31 and 33 of the apparatus 10 and are adapted to engage the respective vertical intersecting walls 119 and 120. The flanges 115 and 117 are each triangularly shaped and are integrally connected to the side edges of the front panel 109. The flanges terminate together at their lower edges at the intersecting walls.

The flanges include C-shaped open slots 131 and 133 for receiving a pair of screws, such as the screw 135 (FIGS. 7 and 8). Thus, the apparatus 107 may be slid rearwardly into the corner space until the slots receive and hook onto the screws.

I claim:

1. A corner mountable lighting apparatus adapted to be mounted in a corner space defined by a pair of intersecting vertical surfaces and by a horizontal surface, comprising:

open frame means adapted to be mounted to at least one of said surfaces;

light emitting means mounted on said frame means;

said frame means having a substantially triangularly shaped inclined front panel disposed in front of said light emitting means and at least partly composed of translucent material to permit light to pass therethrough from said light emitting means, said frame means including mounting means having at least one generally triangularly-shaped member connected fixedly along one of its edges to an adjoining edge of said front panel with the planes of said panel and said member being disposed at an acute angle to enable said apparatus to fit into the corner space and to position said front panel at an incline relative to said member to effectively close off said corner space, said member being adapted to overlie one of said surfaces, said mounting means having means defining at least one fastening member receiving opening therein to facilitate the mounting of said apparatus to at least one of said surfaces, said mounting member being a generally triangularly shaped side flange adapted to engage in overlying relationship one of said vertical surfaces, an oppositely disposed second generally triangularly shaped side flange being adapted to engage in overlying relationship the other one of said vertical surfaces, said fastening member receiving opening including a C-shaped rearwardly-facing open slot, means defining a second fastening member receiving opening, said second opening including a C-shaped rearwardly-facing open slot.

2. A corner mountable lighting apparatus according to claim 1, wherein said frame means comprises a single sheet of plastic material formed into the shape of said triangularly shaped member having the side flanges.

3. A corner mountable lighting apparatus according to claim 1, wherein said light emitting means includes a light directing device adjustably mounted on said frame means.

4. In corner mountable lighting apparatus adapted to be mounted in a corner space defined by a pair of intersecting vertical surfaces and by a horizontal surface, the combination comprising:

open frame means adapted to be mounted to at least one of said surfaces;

light emitting means mounted on said frame means;

said frame means having a substantially triangularly shaped inclined front panel disposed in front of said light emitting means and at least partly composed of translucent material to permit light to pass therethrough from said lighting emitting means, said frame means including mounting means connected fixedly along one of its edges to an adjoining edge of said front panel with the planes of said panel and said member being disposed at an acute angle to enable said apparatus to fit into the corner space and to position said front panel at an incline relative to said member to effectively close off said corner space, said mounting means being adapted to overlie one of said surfaces, said mounting means including a side flange adapted to engage in overlying relationship one of said vertical surfaces, an oppositely disposed second side flange being adapted to engage in overlying relationship the other one of said vertical surfaces.

5. In corner mountable lighting apparatus according to claim 4, wherein said frame means comprises a single sheet of plastic material formed into the shape of said triangularly shaped member having the side flanges.

* * * * *